United States Patent [19]

Takahashi

[11] Patent Number: 4,546,646
[45] Date of Patent: Oct. 15, 1985

[54] SYSTEM FOR DIAGNOSING AN INTERNAL COMBUSTION ENGINE

[75] Inventor: Toshio Takahashi, Tokyo, Japan

[73] Assignee: Fuji Jukogyo Kabushiki Kaisha, Tokyo, Japan

[21] Appl. No.: 535,477

[22] Filed: Sep. 26, 1983

[30] Foreign Application Priority Data

Oct. 1, 1982 [JP] Japan .................. 57-173625
Oct. 1, 1982 [JP] Japan .................. 57-173626

[51] Int. Cl.⁴ .................................... G01M 15/00
[52] U.S. Cl. .................. 73/117.3; 340/52 F
[58] Field of Search ............. 73/116, 118, 119 R, 73/117.3; 340/52 R, 52 F; 123/480, 494

[56] References Cited

U.S. PATENT DOCUMENTS 3,938,075  2/1975  Reddy ........................ 340/52 R
4,001,776  1/1977  Carol, Jr. et al. ........... 340/521 X
4,219,798  8/1980  Frister ....................... 340/52 F
4,244,340  1/1981  Herth et al. ................. 123/440
4,246,566  1/1981  Endo et al. .................. 340/52 F Primary Examiner—Jerry W. Myracle
Attorney, Agent, or Firm—Martin A. Farber

[57] ABSTRACT

A system for diagnosing operations of sensing systems of an internal combustion engine. The system comprises a first diagnosing circuit for diagnosing operation of an important system, such as a coolant temperature sensor, the first diagnosing circuit including a comparator for comparing an input from the sensing system with a reference range and for producing an output when the input is out of the range. A display is provided responsive to the output of the first diagnosing circuit indicating trouble in the sensing system, and a second diagnosing circuit is provided for diagnosing operation of a minor sensing system and for producing an output when the input from the sensing system is abnormal. A gate is provided for electrically connecting the output of the second diagnosing circuit with the display. A manually operated control circuit is provided for operating the gate so as to display the result of the diagnosing of the second diagnosing circuit.

13 Claims, 2 Drawing Figures

SYSTEM FOR DIAGNOSING AN INTERNAL COMBUSTION ENGINE

BACKGROUND OF THE INVENTION

The present invention relates to a diagnosis system for internal combustion engines, and more particularly to a system for diagnosing failure of engine operation control systems of an engine mounted on a motor vehicle.

An electronic fuel-injection system is known of the type which is provided with a computer operable to compute various factors. Such factors may be ignition signal, throttle position, volume of intake airflow, intake manifold vacuum, coolant temperature, and oxygen concentration in exhaust gases in order which produce output signals for driving solenoid-operated injection valves. Some factors are important for engine operation and trouble in sensing systems for such important factors must be immediately warned for the safety of driving of the vehicle. Japanese patent laid open No. 51-20787 discloses a monitor system for displaying trouble in accordance with the importance of trouble which occurs. Minor trouble which does not render the engine inoperative may be diagnosed in a shop by a diagnosis system in the shop.

SUMMARY OF THE INVENTION

The object of the present invention is to provide a system for diagnosing various trouble in sensing systems for an engine, which immediately indicates important or serious trouble during driving and which can be used as a system for diagnosing minor trouble during inspection in a shop.

According to the present invention, there is provided a system for diagnosing operations of sensing systems of an internal combustion engine comprising: a first diagnosing circuit for diagnosing operation of one of said sensing systems, said first diagnosing circuit including comparing means for comparing an input from said sensing systems with a reference value and for producing an output when the input does not coincide with said reference value, a display responsive to said output for indicating trouble in said sensing systems; a second diagnosing circuit for diagnosing operation of another sensing system and for producing an output when the input from the sensing system is abnormal; gate means for electrically connecting the output of said second diagnosing circuit with said display; and manually operated control means for operating said gate means, so as to display the result of the diagnosis of said second diagnosing circuit.

The present invention will be more apparent from the following description made with reference to the accompanying drawings.

DETAILED DESCRIPTION OF THE PREFERRED EMBODIMENT

Figure 1:
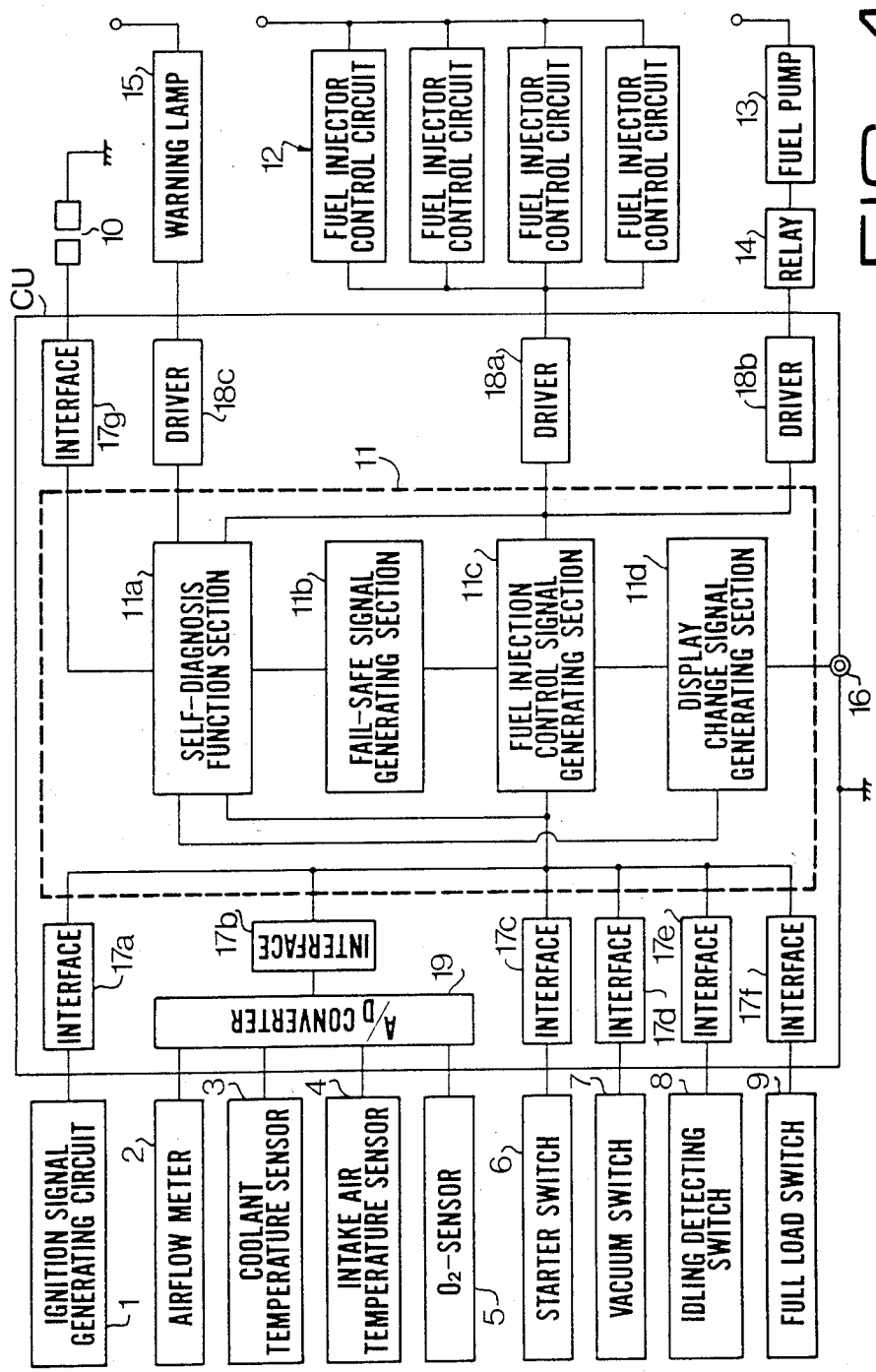
FIG. 1 is a block diagram showing a diagnosis system for operation of an engine.

FIG. 1 diagrammatically shows a diagnosis system for operation of an engine including a system of the present invention.

The system comprises an engine operation detecting means group 1 to 9, and a control unit CU. The control unit CU comprises a computor 11 including memories, I/O and timers, interface group 17a to 17g, and drivers 18a to 18c. The detecting means group comprises an ignition signal generating circuit 1, an output signal of which represents an ignited cylinder of the engine and ignition timing thereof, an air-flow meter 2, a coolant temperature sensor 3, an intake air temperature sensor 4, and an $O_2$-sensor 5 for detecting means group further comprises a starter switch 6 for detecting operation of the starter of the engine, a vacuum switch 7 for detecting the vacuum in the intake passage of the engine, an idling detecting switch 8 which is operated by a throttle valve shaft at the idling position of the throttle valve, and a full load switch 9 which is also operated by the throttle valve shaft at a wide open throttle position of the throttle valve. The computer 11 comprises a self-diagnosis function section 11a, a fail-safe signal generating section 11b, a fuel injection control signal generating section 11c and a display change signal generating section 11d. The self-diagnosis function section 11a is connected to a terminal 10 for checking fault. When the terminal 10 is connected to ground at a shop, a fault condition memorized in the display change signal generating section 11d is displayed by a lamp 16. During driving the motor vehicle, the terminal 10 is disconnected from the ground. The output of the ignition signal generating circuit 1 is applied to a self-diagnosis section 11a and a fuel injection control signal generating section 11c through the interface 17a. Outputs of air-flow meter 2 and sensors 3 to 5 are applied to sections 11a and 11c through an A/D converter 19 and the interface 17b. Further, outputs of the switches 6 to 9 are applied to the sections 11a and 11c through interfaces 17c to 17f, respectively.

The self-diagnosis function section 11a monitors inputs from the engine operation detecting means group 1 to 9 and when any fault is detected, a signal is sent to a warning lamp 15 through the driver 18c for warming of the fault. Further, when such a serious engine trouble occurs that will stall the engine, the self-diagnosis function section 11a sends a diagnosis signal dependent on the kind of the engine trouble to the fail-safe signal generating section 11b. The fail-safe signal generating section 11b stores data to avoid stalling of the engine caused by the engine trouble and produces a fail-safe signal dependent on the diagnosis signal. The fail-safe signal is fed to the fuel injection control signal generating section 11c which operates to stop input from the detecting means group 1 to 9.

In normal engine operation, the fuel injection control signal generating section 11c operates to produce an air-fuel ratio control signal by computing inputs applied from the engine operation detecting means group 1 to 9. The air-fuel ratio control signal is fed to a fuel pump 13 through the driver 18b and a relay 14 and to the fuel injector control circuits 12 through the driver 18a so as to inject fuel in a proper amount at a proper time. Further, the fuel injection control signal generating section 11c sends a signal to a switching section 11d in response to an input from the $O_2$-sensor 5. The switching section 11d sends a signal to the monitor lamp 16 in response to the signal from the fuel injection control signal generating section 11c to indicate the fact that the exhaust gases have a normal oxygen concentration.

When the fail-safe signal is fed from the fail-safe signal generating section 11b to the fuel injector control signal generating section 11c, the section 11c produces a quasi air-fuel ratio control signal dependent on the fail-safe signal. The quasi air-fuel ratio control signal is sent to the fuel injection control circuits 12, so that the engine continues to operate in accordance with the quasi signal without stalling.

Further, the switching section 11d sends a signal to the lamp 16 in dependency on the diagnosis signal fed from the self-diagnosis function 11a. The lamp 16 intermittently lights in accordance with a pattern which is determined by the diagnosis signal by connecting the terminal 10 to the ground at a shop. A person in the shop can recognize the kind of the engine trouble by the pattern of lighting of the lamp 16.

Figure 2:
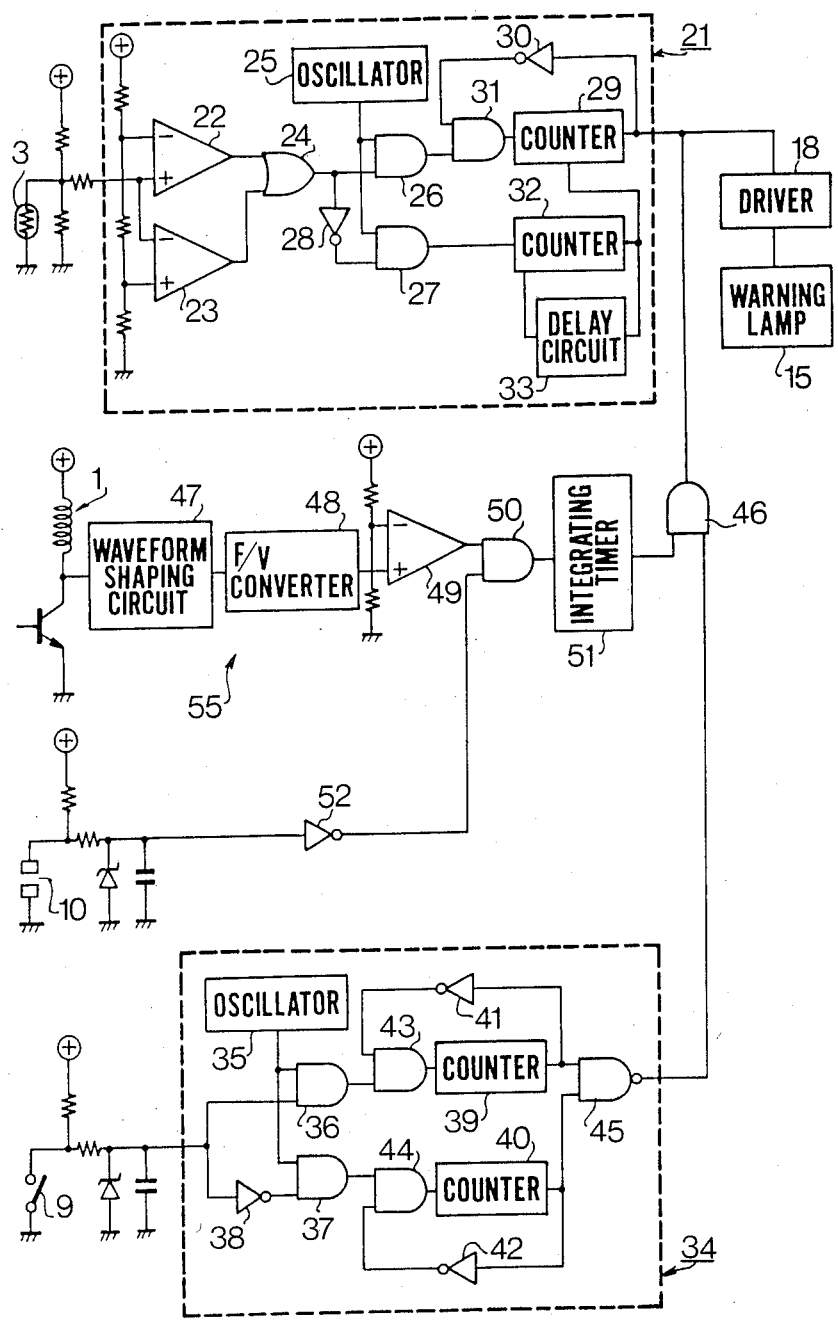
FIG. 2 is diagnosing circuit according to the present invention.

FIG. 2 shows a diagnosing circuit for the coolant temperature sensor 3 and the full load switch 9 according to the present invention. The system comprises a coolant temperature sensor diagnosing circuit 21 as a first diagnosing circuit for serious trouble and a full load switch diagnosing circuit 34 as a secondary diagnosing circuit for minor trouble. The output of the coolant temperature sensor 3 is fed to a window comparator in the coolant temperature sensor diagnosing circuit 21, the window comparator comprising comparators 22 and 23 and an OR gate 24. The output of the OR gate 24 is applied to an AND gate 26 and also applied to an AND gate 27 through an inverter 28. The gates 26 and 27 are applied with pulses from an oscillator 25 to produce pulses dependent on the outputs of the window comparator.

The coolant temperature diagnosing circuit 21 is provided with a first counter 29 for detecting the coolant temperature and a second counter 32 for resetting the first counter 29.

If the output voltage of the coolant temperature sensor 3 exceeds a predetermined range of the window comparator, the output of the OR gate 24 becomes high, so that the AND gate 26 produces pulses. The pulses are applied to the counter 29 through an AND gate 31. When the count of the counter 29 exceeds a set count during a fault condition of the sensor, the counter 29 produces a high level output. The output is applied to the other input of the AND gate 31 through an inverter 30, so that the AND gate 31 is closed to hold the output of the counter 29. The output of the counter 29 is applied to the warning lamp 15 through the driver 18c warning of the fault.

It is necessary to reset the counter 29, if the coolant temperature sensor recovers after a short time. The counter 32 resets the counter 29. The output of the OR gate 24 is at a low level in normal operating condition, so that the AND gate 27 is opened to produce pulses. When the number of pulses applied to the counter 32 reaches a predetermined value which corresponds to the above described short time, the counter 32 produces an output. The output is applied to a reset terminal of the counter 29 to reset it and also applied to its own reset terminal through a delay circuit 33. Thus, the reset operation of the counters 29 and 32 is repeated as long as the coolant temperature sensor 3 is in normal condition.

Further, the system includes a timing control circuit 55 for controlling the timing of the output of the full load switch diagnosing circuit 34. The timing control circuit 55 has a waveform shaping circuit 47 for shaping the output of the ignition signal generating circuit 1. The timing control circuit is provided for checking of a fault of the full load switch 9 at the shop. The output of the circuit 47 is applied to a frequency-to-voltage (F/V) converter 48, the output of which is compared with a reference value by a comparator 49. The comparator 49 produces an output when the engine speed exceeds a predetermined value, which is applied to an AND gate 50.

On the other hand the terminal 10 is grounded for the diagnosis at a shop, so that the output of an inverter 52 goes to a high level. Thus, the AND gate 50 produces an output which is applied to an integrating timer 51. The output of the full load switch 9 is fed to an AND gate 36 and also applied to an AND gate 37 through an inverter 38. The AND gates 36 and 37 are applied with pulses from an oscillator 35 to produce pulses dependent on the outputs of the switch 9.

The full load switch diagnosing circuit 34 is provided with a first counter 39 and a second counter 40. The output pulses of the AND gate 36 are fed to the counter 39 through an AND gate 43 and the output pulses of the AND gate 37 are fed to the counter 40 through and AND gate 44.

When an accelerator pedal of the vehicle is not depressed to the wide open throttle position, the switch 9 is not closed.

Accordingly, a high level output is applied to the AND gate 36, so that the AND gate produces pulses. The pulses are counted by the counter 39. When the count reaches a set count, the counter produces a high level output which is applied to a NAND gate 45 and to the other input of the AND gate 43 through an inverter 41. Thus, the output of the counter 39 is kept at the high level. When the accelerator pedal is depressed to the wide open throttle position, the switch 9 is closed, thereby changing the output of the inverter 38 to a high level.

Thus, the AND gate 37 produces pulses which are counted by the counter 40. When the depression of the accelerator pedal continues over a predetermined time, the counter 40 produces an output signal which is applied to the NAND gate 45 and also to the other input of the AND gate 44 to keep the output. Thus, the output of the NAND gate 45 is at a low level. Therefore, if the timer 51 produces a high level output, which is applied to an AND gate 46, the ouput of the AND gate 46 remains at the low level. This means that the full load switch 9 is normal in operation. If the full load switch 9 is not closed during the wide open throttle operation, the counter 40 does not produce an output. Accordingly the output of the NAND gate is at a high level and the AND gate 46 produces a high level output in dependency on the input from the timer 51.

Thus, the lamp 15 is lighted to warn of the trouble in the full load switch 9 at the shop. Although a full load switch diagnosis circuit is illustrated and described as a second diagnosing circuit for minor trouble, other diagnosis circuits for diagnosing other sensing systems, such as the O₂-sensor and an intake manifold vacuum switch can be similarly provided in accordance with the present invention. Since outputs of such sensing systems as full load switch, O₂-sensor, vacuum switch and others vary during the operation of the engine, it is difficult to diagnose such systems while driving the vehicle. In accordance with the present invention, diagnosis of such systems can be easily done at a shop.

While the presently referred embodiment of the present invention has been shown and described, it is to be understood that this disclosure is for the purpose of illustration and that various charges and modifications may be made without departing from the spirit and scope of the invention as set forth in the appended claims.

What is claimed is:

1. A system for diagnosing operations of sensing systems of an internal combustion engine comprising:
   a first diagnosing circuit for diagnosing operation of a first of said sensing systems, said first diagnosing circuit including comparing means for comparing an input from said first sensing system with a reference and said first diagnosing circuit for producing a first output when the input is different than said reference;
   means comprising a display responsive to said first output for indicating trouble in said first sensing system;
   a second diagnosing circuit for diagnosing operation of a second of said sensing systems and for producing a second output when the operation of the second sensing system is abnormal;
   gate means for electrically connecting the second output of said second diagnosing circuit with said display;
   a manually operated terminal for producing a third output when operated; and
   control means responsive to the third output for opening said gate means so as to apply an occurrence of said second output to the display to indicate abnormality of the diagnosing of said second diagnosing circuit.

2. The system according to claim 1, wherein
   said first diagnosing circuit further comprises
   a counter- and logic circuit operatively connected to said comparing means and providing said first output.

3. The system according to claim 2, wherein
   said counter- and logic circuit comprises
   a first AND gate, a second AND gate and a first counter connected in series in named order, an output of said counter being fed back via a first inverter to another input of said second AND gate, and an oscillator connected to an input of said first AND gate, the other input of said first AND gate is operatively connected to said comparing means.

4. The system according to claim 3, wherein
   said counter- and logic circuit further comprises
   a third AND gate, and a second counter connected to an output of said third AND gate, said second counter having an output connected to reset inputs of said first and second counters, one input of said third AND gate is connected to said oscillator, and a second inverter is operatively connected between said comparing means and the other input of said third AND gate.

5. The system according to claim 4, further comprising
   a delay circuit connected between said output and said reset input of said second counter.

6. The system according to claim 4, wherein
   said comparing means comprises a window comparator comprising two comparators and an OR gate connected between outputs of said two comparators and said other input of said first AND gate and said other input of said third AND gate via said second inverter.

7. The system according to claim 1, wherein
   said second diagnosing circuit comprises
   an oscillator,
   at least one counter- and logic circuit comprising
   a first AND gate, a second AND gate and a first counter connected in series in named order, an output of said counter being fed back via an inverter to another input of said second AND gate, said oscillator being connected to an input of said first AND gate, the other input of said first AND gate is operatively connected to said second sensing system.

8. The system according to claim 7, wherein
   said second diagnosing circuit further comprises
   a NAND gate, and another inverter,
   said second diagnosing circuit includes two of said counter- and logic circuits connected in parallel between said second sensing system and respective inputs of said NAND gate, with said another inverter being between said second sensing means and the other input of one of said first AND gates.

9. The system according to claim 8, further comprising
   a timing control circuit means for controlling timing of the opening of said gate means and including said terminal and said control means, the latter including an integrating timer connected to one input of said gate means, another input of said gate means being connected to an output of said NAND gate.

10. The system according to claim 9, wherein
    said control means includes
    a comparator means for providing a signal when engine speed exceeds a predetermined value,
    an AND gate having inputs operatively connected to said terminal and said comparator means and an output connected to said integrating timer.

11. The system according to claim 1, wherein
    said terminal is groundable.

12. A system for diagnosing operations of sensing systems of an internal combustion engine comprising:
    a first diagnosing circuit for diagnosing operation of a first of said sensing system, said first diagnosing circuit including comparing means for comparing an input from said first sensing system with a reference value and for producing a first output when the input does not coincide with said reference value;
    a display responsive to said first output for indicating trouble in said first sensing system;
    a second diagnosing circuit for diagnosing operation of a second of said sensing systems and for producing a second output when an input from the second sensing system is abnormal;
    gate means for electrically connecting the second output of said second diagnosing circuit with said display;
    manually operated control means for operating said gate means, so as to display a result of the diagnosing of said second diagnosing circuit;
    said manually operated control means comprising a manually operated connector; and
    a gate responsive to the operation of the connector for producing an output to operate said gate means after a predetermined time.

13. A system for diagnosing operations of sensing systems of an internal combustion engine comprising:
    means comprising a first diagnosing circuit for diagnosing operation of a first of said sensing systems, and for producing a first output when the operation of the first of said sensing systems is abnormal;

means comprising a display responsive to said first output for indicating trouble in said first sensing system;

means comprising a plurality of second diagnosing circuits for diagnosing operation of second of said sensing systems and for producing respectively a second output when the operation of a respective of the second sensing systems is abnormal;

gate means for electrically connecting the respective second output of said second diagnosing circuits with said display;

a manually operated terminal for producing a third output when operated; and control means responsive to the third output for opening said gate means so as to apply an occurrence of said respective second output to the display to indicate abnormality of the diagnosing of said second diagnosing circuits.

* * * * *